(12) United States Patent
Beard et al.

(10) Patent No.: US 10,569,246 B2
(45) Date of Patent: Feb. 25, 2020

(54) COMPACT DEVICE FOR MIXING FLUIDS

(71) Applicant: IFP Energies nouvelles, Rueil-Malmaison (FR)

(72) Inventors: Philippe Beard, Saint Genis-Laval (FR); Frederic Bazer-Bachi, Irigny (FR); Cecile Plais, Les Haies (FR); Frederic Augier, Saint Symphorien d'Ozon (FR); Yacine Haroun, Grigny (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 270 days.

(21) Appl. No.: 15/514,017

(22) PCT Filed: Aug. 14, 2015

(86) PCT No.: PCT/EP2015/068766
§ 371 (c)(1),
(2) Date: Mar. 24, 2017

(87) PCT Pub. No.: WO2016/050409
PCT Pub. Date: Apr. 7, 2016

(65) Prior Publication Data
US 2017/0282142 A1    Oct. 5, 2017

(30) Foreign Application Priority Data

Sep. 29, 2014  (FR) .................................... 14 59168

(51) Int. Cl.
*B01J 19/00*     (2006.01)
*B01J 8/04*      (2006.01)
(Continued)

(52) U.S. Cl.
CPC .......... *B01J 8/0453* (2013.01); *B01J 8/0492* (2013.01); *B01J 8/0496* (2013.01); *B01J 19/006* (2013.01);
(Continued)

(58) Field of Classification Search
CPC ............ B01J 19/006; B01J 2208/00362; B01J 2208/00371; B01J 2208/027;
(Continued)

(56) References Cited

U.S. PATENT DOCUMENTS 4,960,571 A   10/1990  Bhagat et al.
8,337,787 B2  12/2012  Augier et al.
(Continued)

FOREIGN PATENT DOCUMENTS

FR    2952835 A1    5/2011
FR    3001899 A1    8/2014

OTHER PUBLICATIONS

International Search Report for PCT/EP2015/068766 dated Oct. 26, 2015.

*Primary Examiner* — Renee Robinson
*Assistant Examiner* — Derek N Mueller
(74) *Attorney, Agent, or Firm* — Millen, White, Zelano and Branigan, P.C.

(57) ABSTRACT

A device for mixing fluids for a downflow catalytic reactor (1), having
at least one substantially horizontal collector (5) provided with a substantially vertical collection conduit (7) receiving fluids collected by said collector (5); an injector (8) injecting a quench fluid opening into said collection conduit (7);
a mixing chamber (9) located downstream of the collector (5) in the direction of movement of the fluids, having an inlet end connected directly to the collection conduit (7) and an outlet end (10) evacuating the fluids; and
(Continued)

a pre-distribution plate (11) having a plurality of perforations and at least one riser (13), being located downstream of said mixing chamber (9) in the direction of movement of the fluids;

the section of the mixing chamber (9) is a parallelogram and has at least one deflector (15) over at least one of the four internal walls of the mixing chamber (9) with a parallelogram section.

16 Claims, 3 Drawing Sheets

(51) Int. Cl.
<table>
<tr><td>C10G 65/10</td><td>(2006.01)</td></tr>
<tr><td>C10G 65/12</td><td>(2006.01)</td></tr>
<tr><td>C10G 45/02</td><td>(2006.01)</td></tr>
<tr><td>C10G 45/32</td><td>(2006.01)</td></tr>
<tr><td>C10G 45/44</td><td>(2006.01)</td></tr>
<tr><td>C10G 47/00</td><td>(2006.01)</td></tr>
</table>

(52) U.S. Cl.
CPC .............. *C10G 45/02* (2013.01); *C10G 45/32* (2013.01); *C10G 45/44* (2013.01); *C10G 47/00* (2013.01); *C10G 65/10* (2013.01); *C10G 65/12* (2013.01); *B01J 2208/00362* (2013.01); *B01J 2208/00371* (2013.01); *B01J 2208/027* (2013.01); *B01J 2219/00765* (2013.01)

(58) Field of Classification Search
CPC ............ B01J 2219/00765; B01J 8/0453; B01J 8/0492; B01J 8/0496; C10G 45/02; C10G 45/32; C10G 45/44; C10G 47/00; C10G 65/10; C10G 65/12
See application file for complete search history.

(56) References Cited

U.S. PATENT DOCUMENTS

<table>
<tr><td>9,452,411 B2</td><td>9/2016</td><td>Haroun et al.</td></tr>
<tr><td>2011/0123410 A1</td><td>5/2011</td><td>Augier et al.</td></tr>
<tr><td>2014/0224707 A1</td><td>8/2014</td><td>Haroun et al.</td></tr>
</table>

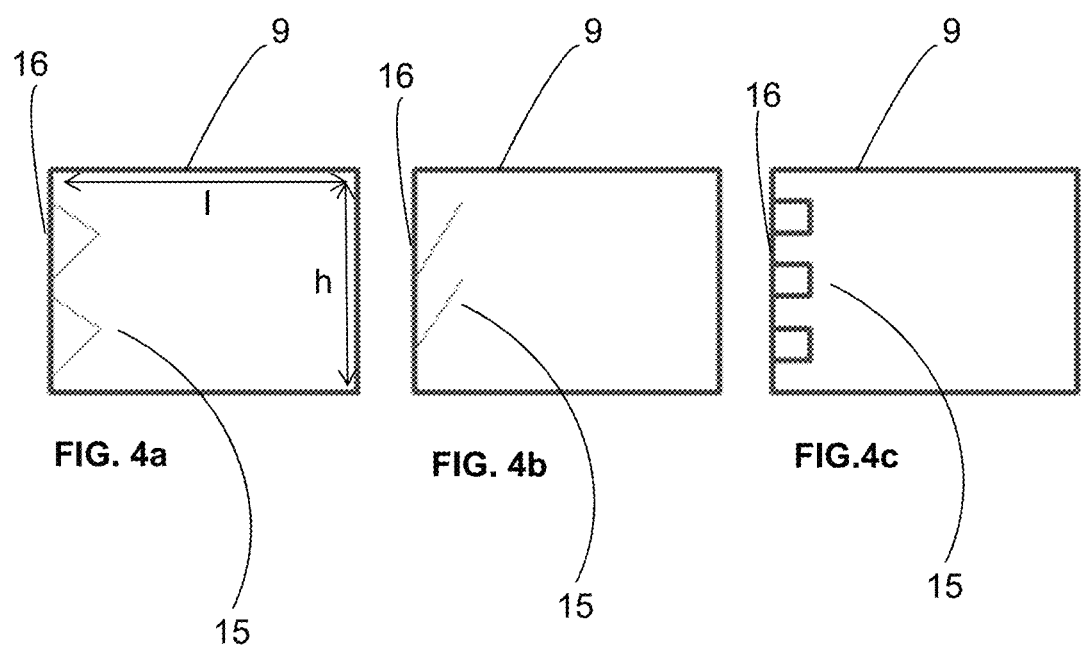

COMPACT DEVICE FOR MIXING FLUIDS

FIELD OF THE INVENTION

The present invention relates to the field of exothermic reactions, and more particularly to hydrotreatment, hydrodesulphurization, hydrodenitrogenation, hydrocracking, hydrogenation or hydrodearomatization reactions carried out in a reactor. The invention also relates to a device for mixing fluids in a downflow reactor and to its use in carrying out exothermic reactions.

PRIOR ART

Exothermic reactions carried out in refining and/or petrochemicals have to be cooled by an additional fluid in order to avoid thermal runaway of the catalytic reactor in which they are carried out. The catalytic reactors used for these reactions generally comprise at least one solid bed of catalyst. The exothermic nature of the reactions means that a homogeneous temperature gradient has to be maintained inside the reactor in order to avoid the appearance of hot spots in the bed of catalyst inside the reactor. These hot spots can prematurely reduce the activity of the catalyst. They also lead to non-selective reactions. Thus, it is important to provide at least one mixing chamber in a reactor, located between two beds of catalyst, which can be used to provide a homogeneous distribution of the temperature of the fluids and cooling of the reaction fluids to a desired temperature.

In order to carry out this homogenization, the skilled person often has to use a specific arrangement of internal means which are frequently complex, comprising introducing a quench fluid in as homogeneous a manner as possible into the section of the reactor. As an example, document FR 2 824 495 A1 describes a quench device which can provide for efficient exchange between the quench fluid or fluids and the process fluid or fluids. That device is integrated into a vessel and comprises a lance for injecting the quench fluid, a fluid collection baffle, the quench box per se, carrying out mixing between the quench fluid and the downwards flow, and a distribution system composed of a perforated tray and a distributor plate. The quench box comprises a deflector which provides the swirling motion of the fluids in a substantially non-radial direction which is not parallel to the axis of said vessel and downstream of the deflector, in the direction of movement of the reaction fluid, and at least one section for the mixture of fluids formed in the box to pass out of it. That device can be used to overcome certain disadvantages of the various prior art systems, but it is still very bulky.

In order to overcome the problem with bulk, a device for mixing fluids in a downflow reactor has been developed and has been described in the document FR 2 952 835 A1. That device comprises a horizontal collection means provided with a vertical collection conduit to receive the fluids, an injection means placed in the collection conduit, and an annular mixing chamber with a circular section located downstream of the collection means in the direction of movement of the fluids. The mixing chamber comprises an inlet end connected to the collection conduit and an outlet end for the passage of fluids, as well as a horizontal pre-distribution plate comprising at least one riser. The advantage of that device is that it is more compact than that described above and can be used to ensure good mixing of the fluids and good homogeneity as regards temperature. However, although it has highly advantageous technical characteristics, the shape of the annular chamber may give rise to difficulties with design and manufacturing, in particular when the diameter of the mixing chamber is large, which gives rise to high costs in terms of manufacturing.

Thus, the aim of the present invention is to overcome one or more of the disadvantages of the prior art by proposing a fluid mixing device for a catalytic reactor which is simple in design and manufacture. Another aim of the present invention is to provide a device which is less bulky when placed in a catalytic reactor. Finally, another aim of the present invention is to provide a mixing device with good fluid mixing efficiency and which exhibits good temperature homogeneity.

AIMS OF THE INVENTION

In a first aspect, the invention concerns a device for mixing fluids for a downflow catalytic reactor, said device comprising:
  at least one substantially horizontal collection means provided with a substantially vertical collection conduit for receiving fluids collected by said collection means;
  at least one means for injecting a quench fluid opening into said collection conduit;
  a mixing chamber located downstream of the collection means in the direction of movement of the fluids, said chamber comprising an inlet end connected directly to said collection conduit and an outlet end for evacuating the fluids; and
  a pre-distribution plate comprising a plurality of perforations and comprising at least one riser, said plate being located downstream of said mixing chamber in the direction of movement of the fluids;
  characterized in that the section of said mixing chamber is a parallelogram and in that it comprises at least one means for deflection over at least one of the four internal walls of said mixing chamber with a parallelogram section.

In accordance with a particular embodiment of the device of the invention, the parallelogram section of said mixing chamber is rectangular. Preferably, the ratio between the height "h" of the parallelogram (or rectangular) section and the width "w" of said section is in the range 0.2 to 1.0.

Advantageously, the deflection means occupies at most 5% by volume of the total volume of the mixing chamber, and at most 20 surface % of the total surface area of the section of the mixing chamber.

Preferably, said mixing chamber comprises at least one means for deflection over the longest internal side wall.

Advantageously, said deflection means has any shape that allows the path of the mixture of fluids passing through said mixing chamber to be deflected at least in part.

In a particular embodiment of the invention, the device comprises a plurality of deflection means distributed over one or more horizontal levels of said longest side wall. Advantageously, said deflection means are spaced in a regular or irregular manner over said longest side wall of the mixing chamber. Preferably, said deflection means is a deflection element selected from: a baffle, a vane, an insert and a blade.

Advantageously, the pre-distribution plate is located downstream of the mixing chamber at a distance d2 in the direction of movement of the fluids, the distance d2 being in the range 0 to 100 mm.

Advantageously, the length of the mixing chamber is in the range 90 to 270 degrees.

In another aspect, the invention concerns a catalytic downflow reactor comprising a vessel comprising at least two beds of catalyst separated by an intermediate zone comprising a fluid mixing device in accordance with the invention.

Preferably, the outlet end of the mixing chamber of said mixing device is positioned in a radial direction of the vessel of said catalytic reactor.

Advantageously, the mixing chamber of said device is positioned at the periphery of the vessel of said catalytic reactor.

Advantageously, said mixing chamber of said mixing device is positioned at a distance d1 from the reactor vessel, the distance d1 being in the range 0.5% to 25% of the diameter of the reactor.

In yet another aspect, the invention concerns a process for carrying out an exothermic reaction in a reactor of the invention, in which at least one reaction fluid is moved through at least two beds of catalyst from top to bottom of said reactor, and in which a quench fluid is injected into said mixing device.

In a final aspect, the invention concerns the use of a reactor in accordance with the invention for carrying out exothermic reactions such as hydrotreatment, hydrodesulphurization, hydrodenitrogenation, hydrocracking, hydrogenation or hydrodearomatization reactions.

BRIEF DESCRIPTION OF THE FIGURES

FIGS. 4a, 4b and 4c illustrate several sectional views of the mixing chamber comprising a means for deflecting the mixture of fluids, in a plane transverse to the mixing chamber and along the dashed line B-B as represented in FIG. 2.

DETAILED DESCRIPTION OF THE INVENTION

The compact mixing device of the invention is used in a reactor in which exothermic reactions such as hydrotreatment, hydrodesulphurization, hydrodenitrogenation, hydrocracking, hydrogen or hydrodearomatization reactions are carried out. In general, the reactor is elongate in shape along a substantially vertical axis. At least one reaction fluid (also known as process fluid) can be moved from top to bottom of said reactor through at least one bed of catalyst. At the outlet from each bed with the exception of the last bed, the reaction fluid is recovered then mixed with a quench fluid in a compact fluid mixing device before being distributed to the bed of catalyst located downstream of the distributor plate. "Upstream" and "downstream" are defined with respect to the direction of flow of the reaction fluid. The reaction fluid may be a gas or a liquid, or a mixture containing liquid or gas; this depends on the type of reaction carried out in the reactor.

Figure 1:
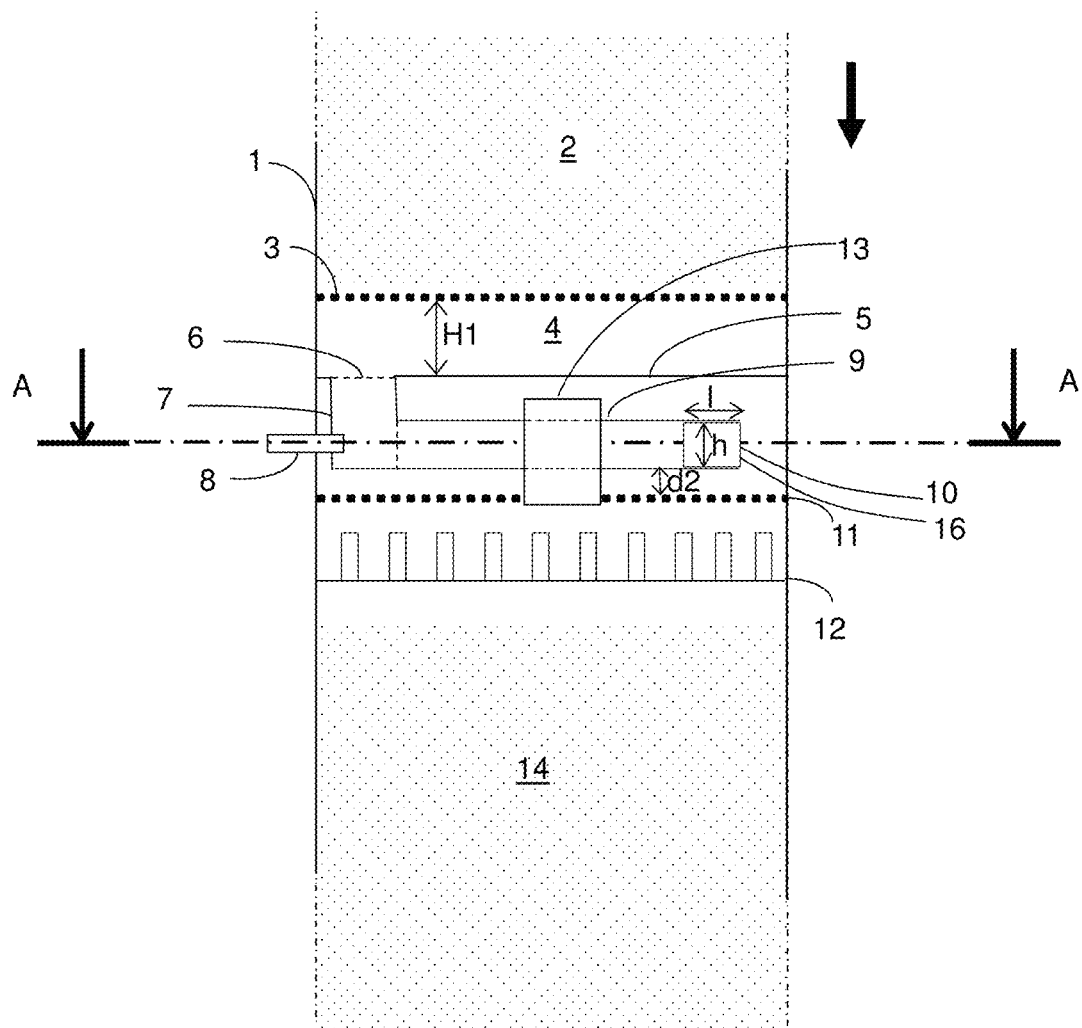
FIG. 1 represents an axial section of a catalytic downflow reactor comprising at least two beds of solid catalyst, and comprising the compact mixing device of the invention. The bold arrow represents the direction of flow of fluids in the reactor.

As can be seen in FIG. 1, the mixing device of the invention is disposed in a reactor 1 which is elongate in shape along a substantially vertical axis in which at least one reaction fluid is moved from top to bottom through at least one bed of catalyst 2. The mixing device of the invention is disposed below the bed of catalyst 2 with respect to the flow of reaction fluid in the vessel 1. A support screen 3 can be used to support the bed of catalyst 2 so as to open up a collection area 4 below it. The collection area 4 is necessary in order to allow the reaction fluid to drain to a collection conduit 7 (described below). The reaction fluid which is flowing is composed of a gas phase and a liquid phase, for example. More particularly, the reaction fluid passing through the upstream bed of catalyst 2 is collected by a collection means 5 (also termed a collection baffle here) which is substantially horizontal provided with a collection conduit 7 which is substantially vertical (see FIG. 1). The terms "substantially vertical" and "substantially horizontal" as used in the context of the present invention mean a variation of a plane from the vertical or horizontal by an angle α in the range ±5 degrees. The collection means 5 is constituted by a solid plate disposed in the plane perpendicular to the longitudinal axis of the vessel below the support screen 3 of the catalyst bed 2. The plate of the collection means 5 extends radially over the whole surface of the reactor 1. At its end, it comprises an opening 6 to which said collection conduit 7 is connected. The collection means 5 can be used to collect the flow of reaction fluid arriving from the upstream catalytic bed 2 and direct it towards said collection conduit 7. The collection means 5 is separated from the support screen 3 of the bed of catalyst 2 by a height H1. The height H1 must be selected in a manner so as to limit the pressure drop when the fluid flowing from the bed of catalyst 2 is collected, and to limit the head, i.e. the height formed by the liquid accumulated in the collection means 5. The head must not modify drainage of the reaction fluid towards the collection conduit 7, nor its flow in this conduit. In one embodiment of the invention, the height H1 is in the range 30 to 200 mm, preferably in the range 30 to 150 mm, more preferably in the range 40 to 100 mm. In one embodiment of the invention, the height H1 is equal to 100 mm. Thus, the reaction fluid arriving from the bed 2 into the collection area 4 is constrained to pass through the vertical collection conduit 7.

The quench fluid is injected into the collection conduit 7 via an injection means 8, for example an injection conduit 8. The quench fluid may be liquid or gaseous, or a mixture containing liquid or gas. As an example, the quench fluid may be hydrogen. The quench fluid is injected perpendicular to the direction of flow of the reaction fluid in the collection conduit 7. The injection means 8 used is familiar to the skilled person. It may be a side connection or a jet or spider, or an array of jets, etc. The injection means 8 is located at any position and height in the collection conduit 7 from the opening 6. Preferably, the injection means 8 is located at the level of the connection of the collection conduit 7 and the inlet end of the mixing chamber 9.

The vertical collection conduit 7 opens into the mixing chamber 9 at the inlet end of said chamber. This conduit directs the flow of reaction fluid and quench fluid into said chamber. The diameter of the vertical conduit 7 is selected in a manner such as to limit the pressure drops. It is thus selected in a manner so as to limit the rate of flow, in said collection conduit, of the reaction fluid(s) arriving from the catalyst bed located upstream of the collection means. Preferably, the velocity of said fluids is in the range 2 to 5 m/s.

The mixing chamber 9 is connected via its inlet end to the collection conduit 7. The quench fluid and the flow of reaction fluid obtained from the upper bed 2 are thus forced to enter said mixing chamber 9 in which they are mixed and have a swirling flow. At the outlet from said mixing chamber 9, the mixture of the fluids flows over the pre-distribution plate 11. The mixing chamber 9 is placed at the periphery of the reactor 1 above the pre-distribution plate 11 in the form of a perforated plate. This position means that space in the reactor is saved. The fluids continue to be mixed by means of a swirling flow of the fluids over the perforated plate of the pre-distribution plate 11. The gas and/or liquid phases of the mixture are separated on the perforated plate, which is provided with one or more central risers 13 for the passage of gas. The risers 13 are preferably located at the centre of the pre-distribution plate 11 so that they do not disrupt the swirling flow of the mixture of fluids onto said pre-distribution plate 11. The pre-distribution plate 11 extends radially over the whole surface of the reactor and is disposed in the plane perpendicular to the longitudinal axis of the vessel. It allows for a first separation of the mixture; the liquid flows through the perforations of the pre-distribution plate 11 and the gas flows through said risers 13 in order to supply a distributor plate 12. The number and size of the performances of the perforated plate 11 are selected in a manner such that a certain height of liquid is always present on the plate. The distributor plate 12 can be used to optimize the distribution of cooled reaction fluid over the catalytic bed 14 located downstream of said distributor plate. The distributor plates are well known to the skilled person. Distributor plates of this type have in particular been described in patent application WO-A-2003/039733.

Figure 2:
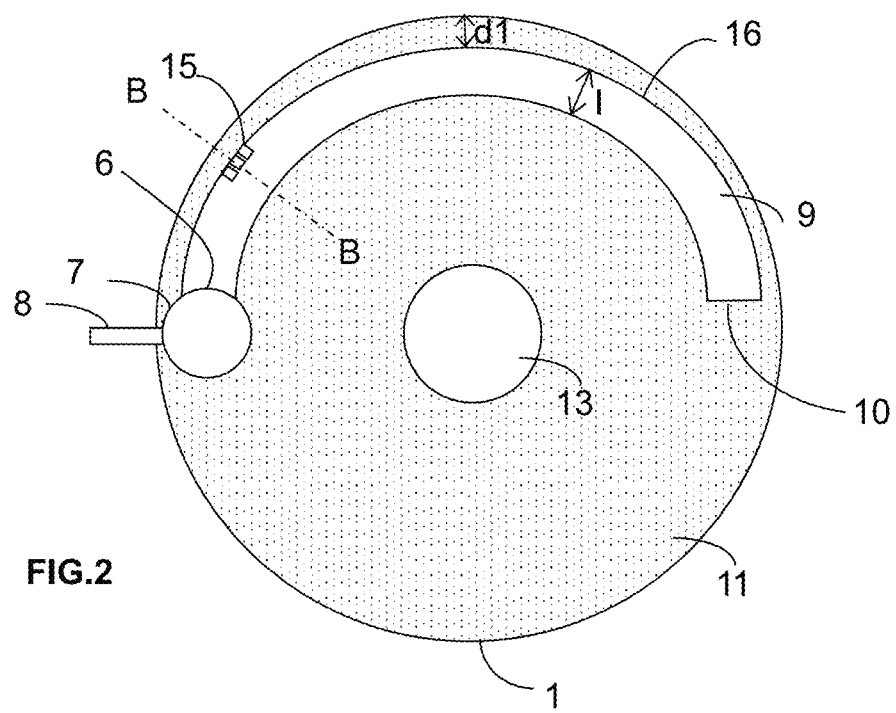
FIG. 2 represents a section of the compact mixing device in a section represented by the dashed line A-A in FIG. 1.
Figure 3:
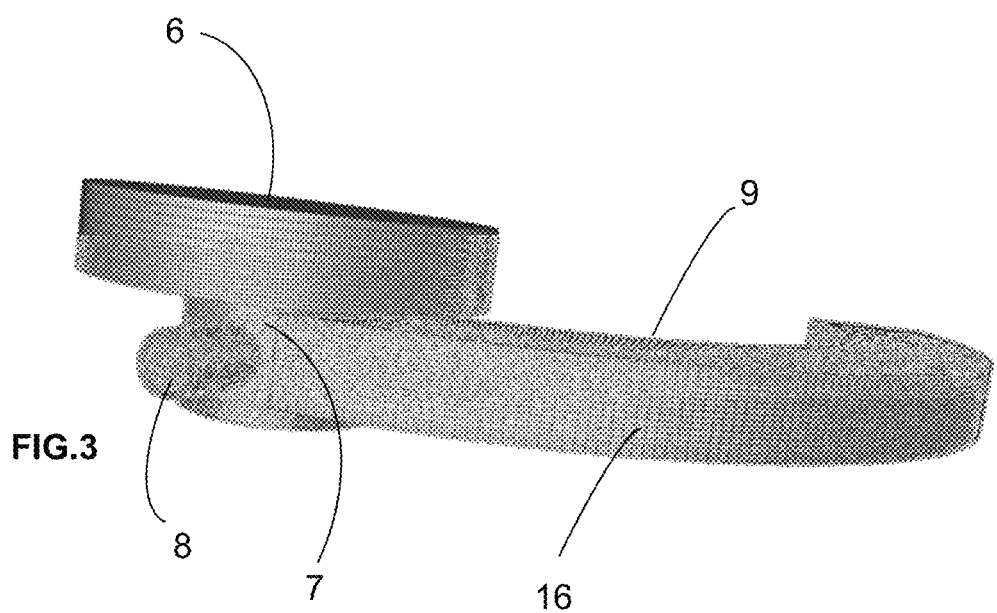
FIG. 3 is a perspective view of the mixing device of the invention.

As mentioned above, the mixing chamber 9 can be used to mix reaction fluid with quench fluid. Referring to FIGS. 2 and 3, the mixing chamber 9 is substantially toroidal in shape and has a parallelogram section (rectangular in the context of FIG. 1). The term "parallelogram section" means any section with four sides wherein the opposite sides of said section are parallel to each other. As an example, the parallelogram section may be a rectangular section, a square section, or a lozenge section. Thus, it comprises two ends: an end termed the inlet end, or a lozenge end. It thus has two ends: an end termed the inlet and an end termed the outlet end 10, opposite to the inlet end. The inlet end is connected to the collection conduit 7 and the outlet end 10 is open and can be used to mix the fluids flowing over the pre-distribution plate 11. The length of the mixing chamber is defined by the angle formed by the planes passing through the two ends of said chamber. The length of said chamber is in the range 90 to 270 degrees. Preferably, the length of said chamber is in the range 100 to 200 degrees, more preferably in the range 100 to 250 degrees, still more preferably 100 to 180 degrees, and still more preferably 120 to 180 degrees.

The dimensions of the parallelogram section of the mixing chamber, with height "h" and width "w", are such that the ratio between the height "h" and width "w" is in the range 0.2 to 1.0, preferably in the range 0.4 to 0.6. The height "h" of the mixing chamber is selected so as to limit the pressure drop as far as possible and so as to limit the bulk in the reactor. In fact, the pressure drop for the mixing device of the invention depends on the height "h" and the width "l" of the mixing chamber. This pressure drop follows the conventional pressure drop law and can be defined by the following equation:

$$\Delta P = \frac{1}{2}\rho_m V_m^2 \chi \quad (1)$$

where $\Delta P$ is the pressure drop, $\rho_m$ is the mean density of the gas+liquid mixture in the mixing chamber, $V_m$ is the mean velocity of the gas+liquid mixture and $\chi$ is the pressure drop coefficient associated with the mixing device.

In accordance with a preferred embodiment of the invention, the height "h" and width "w" of the section of the mixing chamber 9 is as small as possible in order to limit the bulk of the mixing chamber on the pre-distribution plate and to have as high an efficiency of mixing at the outlet 10 from said mixing chamber. For these reasons, it is preferable to use the lowest height "h" that is possible for complying with any maximum pressure drop criterion. The preferred range for the pressure drop when setting the dimensions of industrial devices is 0.1 bar<$\Delta P_{max}$<0.2 bar (1 bar=$10^5$ Pa). In accordance with a particular embodiment of the invention, the outlet 10 from the mixing chamber 9 has a height "h'" and/or a width "w'" which is less than the height "h" and/or the width "w" of the section of the mixing chamber 9 (without the outlet) in order to further improve the homogeneity of mixing. The ratio h'/h and/or w'/w is in the range 0.5 to 1, preferably in the range 0.7 to 1.

The fluids carry out a rotational movement (swirling) in the mixing chamber 9. This movement encourages mixing and homogeneity of the temperature of the reaction fluids and the quench fluid.

In addition, in accordance with an essential aspect of the mixing device of the invention, the mixing chamber 9 comprises at least one means 15 for deflecting the mixture of fluids passing through said mixing chamber 9. Said deflection means 15 may have a number of geometric shapes for improving the efficiency of the mixing chamber, it being understood that said shapes can at least partially deflect the path of the mixture of fluids passing through said chamber. As an example, the deflection means 15 may have the shape of a baffle, with a triangular section (FIG. 4a), a square section (FIG. 4c), a rectangular section, an oval section or any other sectional shape. The deflection means 15 may also be in the form of one or more vane(s) (FIG. 4b) or even one or more fixed blade(s). Said means 15 for deflecting the mixture of fluids passing through said mixing chamber 9 is located on at least one of the four internal walls of said mixing chamber with a parallelogram section. Preferably, the means 15 for deflecting the mixture of fluids passing through said chamber are at least, preferably exclusively, located on the internal side wall 16 of the mixing chamber 9 closest to the internal wall of the reactor 1 (i.e. the side wall of the mixing chamber with the greatest length). When the deflection means 15 is in the form of a vane, said deflection means 15 may have an orientation which is perpendicular to the side walls of said mixing chamber 9. Alternatively, said deflection means 15 may be orientated at an angle alpha in the range −90° to +90°, the values −90° and +90° being excluded, preferably in the range −60° to +60° with respect to a plane perpendicular to the side walls of the mixing chamber 9.

The Applicant has surprisingly discovered that the specific shape of the section of the mixing chamber 9 (i.e. a parallelogram) and the presence of at least one means 15 for deflecting the mixture of fluids passing through said chamber can be used to significantly increase the exchange surface between the two phases and thus the efficiency of heat transfer and matter transfer between the liquid phase and the gas phase passing through said chamber. Advantageously, the deflection means 15 may be spaced in a regular or irregular manner in the mixing chamber 9. Advantageously, the deflection means 15 may be located on a plurality of horizontal levels over the side wall 16 of the mixing chamber 9.

Advantageously, the mixing chamber 9 comprises at least one means 15 for deflecting a mixture of fluids passing through said mixing chamber, preferably at least two deflection means. In accordance with one aspect of the invention, said at least one means 15 for deflecting the mixture of fluids preferably occupies at most 20% of the surface of the section of the mixing chamber 9, preferably at most 15% of the surface. In addition, the volume occupied by said at least one means 15 for deflecting a mixture of fluids preferably occupies at most 5% by volume of the total volume of the mixing chamber, preferably at most 3% by volume. In fact, the compromise between the surface area and the volume occupied by the deflection means 15 in the mixing chamber means that the pressure drop can be limited.

Referring now to FIGS. 1 and 2, the mixing chamber 9 is positioned at the periphery of the vessel of the reactor 1 and upstream of the pre-distribution plate 11 with respect to the direction of flow of the fluids. This positioning of said chamber means that its length can be maximized and space can be saved in the reactor. The mixing chamber has a curved shape, and so it runs alongside the vessel of the reactor at a distance d1 therefrom (FIG. 2). So that the compact mixing device of the invention takes up as little space as possible in the reactor, the distance d1 will be in the range 0.5% to 25% of the diameter of the reactor, preferably in the range 0.5% to 10% of the diameter of the reactor, more preferably in the range 1% to 5% of the diameter of the reactor.

In a preferred embodiment, the mixing chamber 9 is in direct contact with the pre-distribution plate 11. In this configuration, the mixing chamber is thus positioned directly on the pre-distribution plate. In another embodiment, said chamber is located at a distance d2 from the pre-distribution plate 11. In this case, said chamber 9 will be fixed on the pre-distribution plate 11 via fixing means which are well known to the skilled person, such as hollow feet. These feet will be positioned in the direction of flow of the mixture. The distance d2 varies between 0 and 100 mm, more preferably between 0.25 and 100 mm, more preferably between 0.25 and 50 mm, still more preferably between 0.5 and 30 mm.

Positioning the mixing chamber 9 at the periphery of the reactor and upstream of the pre-distribution plate 11 also means that the flow of the mixture of fluids above or over the pre-distribution plate is tangential, depending on the embodiment of the invention. This tangential flow above said pre-distribution plate means that the efficiency of mixing can be maximized. In fact, continuous mixing between the reaction fluid is carried out at the level of the pre-distribution plate. A mixture is obtained on the pre-distribution plate 11 which is homogeneous both as regards to temperature and concentration of the fluids.

Compared with prior art devices, and more particularly compared with the device disclosed in the document FR 2 952 835 A1, the compact device of the invention has the following advantages:
- better thermal efficiency and better mixing efficiency due to the rotary flow in the mixing chamber over or at the pre-distribution plate, because of a synergistic effect between the shape of the section of the mixing chamber and the presence of at least one means for deflecting the mixture of fluids passing through said mixing chamber;
- easier manufacture of the mixing chamber (with a parallelogram section) compared with that described in application FR 2 952 835 A1 (with a circular section), even more so because addition of the deflection means is easier in the case of parallelogram sections than with circular sections;
- increased compactness due to the parallelogram shape of the section of the mixing chamber and the positioning of said mixing chamber, which is very close to the pre-distribution plate, as well as the injection of the quench fluid.

In the examples below, the terms "torus" or "mixing chamber" are used indiscriminately to designate the mixing chamber with a parallelogram section of the invention. In addition, the mixing chambers of the examples below comprise a rectangular section; this does not in any way limit the invention, wherein the device comprises a mixing chamber with a parallelogram section.

In the examples below, the mixing device of the invention (device C) is compared with two mixing devices which are not in accordance with the invention (devices A and B). The comparisons between these three devices are based on the compactness of the devices in a catalytic reactor, as well as their mixing efficiency. These examples are presented here by way of illustration and do not in any way limit the scope of the invention.

The three devices illustrated in the examples are presented below.

Device A: not in accordance with the invention (mixing chamber with a circular section without a deflection means for the mixture of fluids).

Device B: not in accordance with the invention (mixing chamber with a rectangular section without a deflection means for the mixture of fluids).

Device C: in accordance with the invention (mixing chamber with a rectangular section comprising a plurality of deflection means in the form of baffles).

In the examples below, the dimensions of the reactors and the constituent elements were identical, except as regards the shape and/or dimensions of the mixing chamber and as regards the presence or otherwise of a means for deflecting the fluid mixture. The basis of three devices was a reaction vessel diameter of 4 m. The density of the liquid phase was 800 kg/m$^3$, and that of the gas was 20 kg/m$^3$. The flow rates of the liquid and gas leaving the first catalytic bed were respectively 0.1 and 0.63 m$^3$/s. The flow rate of the quench fluid injected into the vertical collection conduit via an injection means was 0.63 m$^3$/s. The height of the collection area (H1) was 0.2 m, in a manner such as to generate a negligible pressure drop in this zone. The diameter of the vertical collection conduit was 0.48 m. The diameter of the quench fluid injection means was 0.15 m. The linear length of the mixing chamber was 3.1 m. The space between the reactor vessel and the annular mixing chamber (d1) was 0.36 m for device A. Four central risers were disposed in a square pattern in the centre of the perforated plate of the pre-distribution plate. These risers had a diameter of 0.3 m and a height of 0.25 m. The pre-distribution plate was perforated with 1 cm diameter holes in a triangular pattern of perforations with a pitch of 6.4 cm. A distributor plate with risers was positioned beneath the perforated plate. The distance between the perforated pre-distribution plate and the distributor plate was 0.25 m.

Example 1: Compactness of the Mixing Device of the Invention

Device A (not in accordance with the invention): the diameter of the annular mixing chamber with a circular section was 0.35 m. The bulk of the mixing device not in accordance with the invention, defined by the support screen for the catalyst and by the pre-distribution plate, was approximately 0.5 m. It would have been approximately 0.75 m if the bulk of the distributor plate located below the pre-distribution plate had been added.

Device C (in accordance with the invention): the mixing chamber of the device of the invention comprised a rectangular section with a width/height ratio selected to be equal to 2. The section had a height of 220 mm. The space saving compared with the annular chamber with a circular section of the mixing device A (not in accordance with the invention) was 130 mm. Thus, by way of comparison, the mixing device of the invention could provide a space saving of 17% compared with device A. The space saved by the compactness of the device of the invention compared with the prior art device may thus be used for beds of catalyst. Thus, the compact mixing device of the invention can also be used to improve the performance of a reactor by increasing the quantity of catalyst in the catalytic beds.

Device C also comprised deflection means 15 in the form of baffles, i.e. flat plates disposed at the bottom of the wall 16. In this example, two baffles are considered, one located in the first half of the mixing chamber and the other in the second half of the mixing chamber.

Device B (not in accordance with the invention), with a rectangular section, had the same characteristics in terms of compactness as device C in accordance with the invention. This device did not have the deflection means 15.

Example 2: Analysis of Flow of Fluids in the Mixing Chamber

The flow of two fluids in the mixing chambers of devices A, B and C was simulated using fluid mechanics software (Fluent 14.5, developed by ANSYS In, Canonburg, USA). The digital simulations were based on an analysis of the mixing phenomena in the mixing chamber and at the outlet from said chamber.

The characteristics of the various mixing chambers tested and the experimental conditions for the simulation are presented in Table 1 below.

TABLE 1

|  | Torus length (m) | Liquid phase flow rate (m³/s) | Gas phase flow rate (m³/s) | Temperature T1 (K) | Temperature T2 (K) |
|---|---|---|---|---|---|
| Device A (not in accordance) | 3.1 | 0.1 | 0.6 | 323 | 573 |
| Device B (not in accordance) | 3.1 | 0.1 | 0.6 | 323 | 573 |
| Device C (invention) | 3.1 | 0.1 | 0.6 | 323 | 573 |

In order to carry out these simulations, the most unfavourable case was used, i.e. in the case in which the fluids (process fluid and gaseous hydrogen) are not mixed at all at the inlet to the mixing device. Thus, the software was configured as follows: the fluids were supplied to the inlet to the mixing device at two distinctly different temperatures, T1 (for the process fluid) and T2 (for hydrogen). More precisely, the temperature T1 corresponded to the temperature of the process fluid measured at the opening 6 and the temperature T2 corresponded to the temperature of the hydrogen measured at the outlet from the injection means 8.

The temperature distribution calculated at the outlet from the torus by the simulation software was used to estimate the efficiency of mixing in the mixing chamber. This efficiency is defined by the following relationship:

$$\eta = 1 - \frac{|T_{Liq,MAX} - T_{Gas,MIN}|}{\Delta T_{MAX}} \quad (2)$$

where $\eta$ is the efficiency of mixing, $T_{Liq,MAX}$ is the maximum temperature of the liquid at the outlet, $T_{Gas,MIN}$ is the minimum temperature of the gas at the outlet, and $\Delta T_{MAX}$ is the maximum difference between the inlet temperatures, i.e. the absolute value of (T2−T1).

The results obtained from the various simulations are presented in Table 2 below. The mixing efficiencies were calculated at the outlet 10 from the mixing chamber 9.

TABLE 2

|  | Device A | Device B | Device C |
|---|---|---|---|
| Mean temperature difference between gas and liquid at outlet 10 (K) | 33 | 24 | 7 |
| Pressure drop (kPa) | 18.3 | 13.5 | 16.6 |
| Mixing efficiency (%) | 87 | 90 | 97 |

The efficiency of mixing (in accordance with equation 2) generated at the outlet from said mixing chamber 9 was more than 97% in the context of the device of the invention (device C). This means that very good mixing of fluids in the chamber of the invention and excellent homogenization of the fluids as regards temperature were obtained.

The invention claimed is:

1. A device enabling mixing of fluids for a downflow catalytic reactor (1), said device comprising:
   at least one substantially horizontal collector (5) provided with a substantially vertical collection conduit (7) enabling fluids to be collected by said collector (5);
   at least one injector (8) enabling injection of a quench fluid which opens into said collection conduit (7);
   a mixing chamber (9) located downstream of the collector (5) in the direction of movement of the fluids, said chamber comprising an inlet end connected directly to said collection conduit (7) and an outlet end (10) enabling evacuation of the fluids; and
   a pre-distribution plate (11) comprising a plurality of perforations and comprising at least one riser (13), said plate being located downstream of said mixing chamber (9) in the direction of movement of the fluids;
   said mixing chamber (9) having a parallelogram shaped cross section and comprising at least one deflector (15) enabling deflection over at least one of the four internal walls of said mixing chamber (9) having a parallelogram cross section.

2. The device according to claim 1, wherein the parallelogram cross section of said mixing chamber (9) is rectangular.

3. The device according to claim 1, wherein said parallelogram cross section is such that the ratio between the height "h" of the section and the width "w" of said section is in the range of 0.2 to 1.0.

4. The device according to claim 1, wherein said deflector (15) occupies at most 5% by volume of the total volume of the mixing chamber, and at most 20% of the total surface area of the section of the mixing chamber.

5. The device according to claim 1, wherein said mixing chamber comprises at least one deflector (15) located over a longest internal side wall (16).

6. The device according to claim 5, comprising a plurality of deflectors (15) distributed over one or more horizontal levels of said longest internal side wall (16).

7. The device according to claim 6, wherein said deflectors are spaced in a regular manner over said longest internal side wall (16) of the mixing chamber (9).

8. The device according to claim 6, wherein said deflectors are spaced in an irregular manner over said longest internal side wall (16) of the mixing chamber (9).

9. The device according to claim 1, wherein said deflector (15) is a baffle, a vane, an insert, or a blade.

10. The device according to claim 1, wherein the pre-distribution plate (11) is located downstream of the mixing chamber (9) at a distance d2 in the direction of movement of the fluids, the distance d2 being in the range 0 to 100 mm.

11. The device according to claim 1, wherein an arc of the mixing chamber (9) is in the range of 90 to 270 degrees.

12. A catalytic downflow reactor comprising a vessel (1) comprising at least two beds of catalyst (2; 14) separated by an intermediate zone comprising a fluid mixing device according to claim 1.

13. The reactor according to claim 12, wherein the outlet end (10) of the mixing chamber (9) of said mixing device is positioned in the radial direction of the vessel of said catalytic reactor (1).

14. The reactor according to claim 12, wherein the mixing chamber (9) of said device is positioned at the periphery of the vessel of said catalytic reactor (1).

15. The reactor according to claim 12, wherein said mixing chamber (9) of said mixing device is positioned at a distance d1 from the reactor vessel (1), the distance d1 being in the range of 0.5 to 25% of the diameter of the reactor.

16. A hydrotreatment, hydrodesulphurization, hydrodenitrogenation, hydrocracking, hydrogenation or hydrodearomatization reaction, comprising subjecting a feed to reaction in a reactor according to claim 12.

* * * * *